United States Patent
Tosteson

[15] 3,657,095
[45] *Apr. 18, 1972

[54] ELECTRODE SYSTEM FOR MEASURING ION ACTIVITY HAVING SENSING AND UNKNOWN SOLUTIONS IN DIRECT CONTACT

[72] Inventor: Daniel C. Tosteson, Durham, N.C.
[73] Assignee: Duke University, Inc., Durham, N.C.
[ * ] Notice: The portion of the term of this patent subsequent to Oct. 26, 1988, has been disclaimed.
[22] Filed: July 14, 1969
[21] Appl. No.: 841,393

[52] U.S. Cl............................................204/195, 204/1 T
[51] Int. Cl. .....................................................G01n 27/30
[58] Field of Search...............204/195 M, 195 B, 1 T; 324/29

[56] References Cited

UNITED STATES PATENTS 3,429,785   2/1969   Ross................................204/195 X Primary Examiner—G. L. Kaplan
Attorney—B. B. Olive

[57] ABSTRACT

Measurement of the activity of a particular chemical species of ion, e.g. potassium ion, in an aqueous solution is obtained by means of a selective element which contains an ion selective macrocyclic compound and which is dissolved to form a non-aqueous phase. During sensing, the aqueous and non-aqueous phases make direct contact.

5 Claims, 4 Drawing Figures

PATENTED APR 18 1972　3,657,095

INVENTOR.
Daniel C. Tosteson

BY

*B. B. Olive*

ATTORNEY

ELECTRODE SYSTEM FOR MEASURING ION ACTIVITY HAVING SENSING AND UNKNOWN SOLUTIONS IN DIRECT CONTACT

CROSS-REFERENCE TO RELATED APPLICATIONS

This application is related to two co-pending applications namely, Ser. No. 692,065 entitled "Electrode for Measuring Potassium and Other Specific Ion Activites," filed Dec. 20, 1967 and Ser. No. 735,286 entitled "Electrode System For Measuring Ion Activities In Stream Or Sample" filed June 7, 1968. The present application and the two co-pending applications are related in that the electrodes described are all based on employment of a sensing layer having the selective character of a macrocyclic compound.

BACKGROUND OF THE INVENTION

1. Field of the Invention

The invention may be said to relate broadly to the measurement of the activity of a particular chemical species of ion in an aqueous solution which also contains other species and which solution may be flowing or static. More specifically the invention relates to apparatus and associated compounds used to establish ion selectivity and to measure ion activity and sometimes referred to as ion electrodes, ion selective electrodes, ion activity electrodes, ion exchange membranes or electro-chemical cells. The invention is uniquely applicable to the measurement of potassium ion activity in a stream or static sample of aqueous solution.

2. Description of the Prior Art

Various methods and apparatus have been employed for the measurement of ion activity. While potentially applicable to the measurement of other ion activities and to measurement in static solutions, the invention is known to be particularly useful for the continuous measurement of potassium ion activity in a stream of aqueous solution. The discussion of the prior art practices is therefore limited to a discussion of prior art practices with respect to potassium ion activity and primarily to those directed to analysis of discrete samples. From such discussion it is believed that those skilled in the art will readily see the relation of the prior art to the application of the invention to continuous flow measurements, to measurement of discrete samples and to measurements of ionic activities other than potassium. In this regard it may be noted that the present invention relates to discrete sampling, to continuous flow measuring and to ion activity other than potassium.

It has long been recognized that potassium ions play a vital role in many physiological processes. For example, the resting electrical potential difference (resting potential) between the inside and outside of most excitable cells (e.g. nerve cells; skeletal, smooth and cardiac muscle cells) is dependent on the facts that the potassium ion concentration is much higher in the intra-cellular than in the extra-cellular fluid and that the surface membrane of these cells when they are at rest is much more permeable to potassium than to other cations. Indeed, the magnitude of the resting potential in such cells has been shown to depend in large part on the ratio of intra-cellular to extracellular potassium ion concentration. Since excitability is, in turn, dependent on the magnitude of the resting potential; it is evident that small changes in the concentration of potassium ions in the extra-cellular fluid have profound effects on the activity of nerve and muscle cells. For example, an increase in the concentration of potassium ions in extra-cellular fluid (e.g. blood plasma) from the normal value of 4–5 mM to 8–9 mM can produce complete loss of excitability of cardiac muscle cells and thus cessation of the pumping action of the heart. While changes in potassium ion concentrations in the human body are slow and normally are expressed in terms of hours, the significance of such changes are marked. For this and other important reasons a continuing knowledge of the concentration of potassium ions in blood plasma is of great importance to physicians in the management of many clinical disorders such as acute and chronic renal disease, endocrine diseases such as adrenal insufficiency and diabetes mellitus, disturbances of fluid balance produced by vomiting and diarrhea, circulator shock, digitalis intoxication, etc. Therefore, the availability of a rapid, direct and stable method and apparatus for the measurement of discrete samples or for continuous measurement or monitoring of potassium activity in moving streams of biological fluids is of significant interest to biological, physiological, biochemical and pharmacological research, as well as to clinical medicine.

Potassium ion concentrations in static biological and other aqueous fluid samples have been measured previously by precipitation methods and by flame emission and atomic absorption photometry. These procedures required considerable sample preparation and manipulation and are therefore time consuming. They are not directed to monitoring a continuous flow. Furthermore, they measure the amount of potassium ion present in the sample rather than the activity of the ion in the solution analyzed. Attempts to formulate glass electrodes which are selective for potassium ions have been carried out in a number of laboratories. If they were sufficiently selective, these electrodes would permit rapid, direct determination of potassium ion activity. However, it has proved impossible to make glass electrodes with a selectivity ratio for potassium to sodium of greater than 10 to 1. Since the concentration of sodium ions in human blood plasma is 30 times greater than the concentration of potassium ions, these glass electrodes are not suitable for measuring potassium ion activity in such fluids either by sample or by monitoring of a continuous flow.

Within the past year, several laboratories have reported that certain macrocyclic compounds, e.g. valinomycin, enniatin B, nonactin, monactin, dinactin, confer marked selectivity for potassium over sodium on thin (ca. $10^{-6}$ cm) lipid bilayer membranes prepared from pure lecithin, mixed brain lipids, and sheep red cell lipids. The electrical potential difference across such a thin membrane responds instantaneously to changes in the ratio of potassium ion concentrations in the aqueous phases bathing the two sides of the membrane. Nevertheless, such thin bilayer membranes are not suitable for the practical measurement of potassium ion activities because of their extreme mechanical fragility.

The described investigations have made clear the remarkable selectivity for potassium over sodium (as great as 1000 to 1) which certain macrocyclic compounds produce in thin bilayers of phospholipid. Also within the past year a report has appeared which describes attempts to make a potassium ion sensitive electrode by filling a sintered glass disc or other supporting medium with a solution of monactin-dinactin in benzene or carbon tetrachloride. Such electrodes show striking selectivity for potassium over sodium ions but are extremely sluggish in response, requiring several hours to reach a steady potential after a change in the potassium ion activity in the test solution. These kinetic characteristics make electrodes of this type unsuitable for practical measurements of potassium ion activities either on a discrete sample or continuous flow measurement. None of the recent prior art has suggested the applicability of such selective electrodes to a closed, continuous monitoring system, nor to an optional flow-static system. Of particular interest to the present invention is that such prior art has not suggested the possibility or practicality of using a macrocyclic compound selective sensing layer in direct contact with the unknown aqueous solution having the ion activity of interest.

The invention of applicant's referred to in co-pending applications Ser. No. 692,065 and Ser. No. 735,286 are directed to ion selective electrodes which measure the activity of a particular chemical species of ion in an aqueous solution sample containing other species of ions. The operation of the electrodes described in the co-pending applications is based on the principle that an electromotive force is developed at an interface established between the aqueous solution and a non-aqueous phase when the interface is established by a surface active agent, which agent contains an ion selective macrocyclic compound and where the agent and compound are dissolved in a solvent which forms the non-aqueous phase. The magnitude of the electromotive force is dependent on the activity of the ion being measured and a change in the electromotive force is developed rapidly after a change in the activity of the ion in the aqueous solution. Such change in electromotive force is measured by conventional means involving reversible half cells and a high impedance potentiometer. More particularly, it has been discovered that an interface established by a surface active agent such as the phospholipid lecithin and which interface also contains an ion selective macrocyclic compound such as a cyclic depsi-peptide (e.g., valinomycin) or a cyclic ester (e.g. , nonactin, monactin, dinactin), gives rise to an electromotive force the magnitude of which depends on the potassium ion activity in the aqueous solution bathing one side of the interface. The interface is located at the surface of contact between the aqueous solution and a non-aqueous, oil phase made up of a non-polar solvent such as decane in which the phospholipid and macrocyclic compound are dissolved.

SUMMARY OF THE INVENTION

The present invention embodies the same type of sensing interface or layer as in the co-pending applications and may be utilized in what might be described as a "flow cell" through which the aqueous solution having the ion activity of interest is pumped as a continuous flowing stream or the present invention may be utilized in dip-stick type static discrete sampling. In both the flow cell and dip-stick embodiments, electrode contact is made with the stream or static sample of aqueous solution and the ionic activity of interest is continuously monitored or measured utilizing an electrode construction having a sensing interface or layer of the type taught by the co-pending applications. Of special interest to the present invention is the fact that the sensing layer is floated on and therefore makes direct layer to layer, contact with the aqueous solution whose ionic activity is of interest. The electrode system of the present invention thus does not require or employ the pair of cellophane sheets taught by the prior filed co-pending applications.

In the flow cell embodiment of the present invention, the flow cell reference solution as well as the membrane forming solution remain static and non-flowing and the entire flow cell operates essentially as a closed system with the membrane forming making direct layer to layer contact with the aqueous solution. Pumping pressure for the continuously flowing aqueous solution may come from the source itself as from a blood vessel or may come from an auxiliary finger pump or the like. In either case, because the system is closed from atmospheric pressure the effect of fluctuations in aqueous solution pumping pressure have minimal effect on the mechanical stability of the very critical detecting layer. Furthermore, in both the flow cell and dipstick embodiment, the sensing electrode structure of the invention calls for an extremely small size layer to layer contact and therefore an inherently mechanically stable sensing layer even though the sensing layer as such is effectively suspended in space and mechanically unsupported by a cellophane membrane or the like. The rate of flow is maintained within limits designed to maintain continuous flow while remaining within the diffusion capacity of the sensing layer. While it might have been expected that the sensing layer would lose its mechanical stability without the mechanical support provided by the cellophane sheets as in the prior application and that the direct layer to layer contact response would be incompatible with monitoring a continuously flowing stream such has not proven to be the case.

The object of the invention is therefore to provide a rapidly responsive system for continuously measuring a specific ion activity in a flowing stream or static sample of aqueous solution.

Other objects will appear from the description and drawings.

DESCRIPTION OF THE PREFERRED EMBODIMENTS

Figure 1:
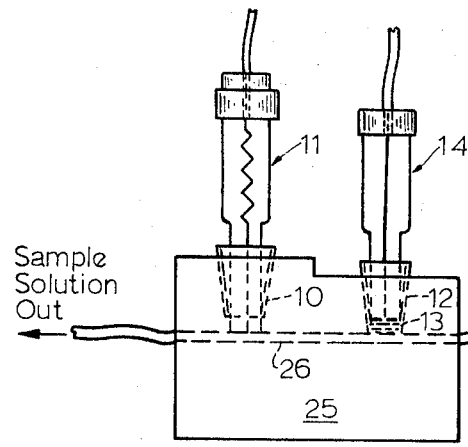
FIG. 1 is a somewhat schematic elevation view of an electrode system incorporating the layer to layer direct contact concept of the invention.
Figure 2:
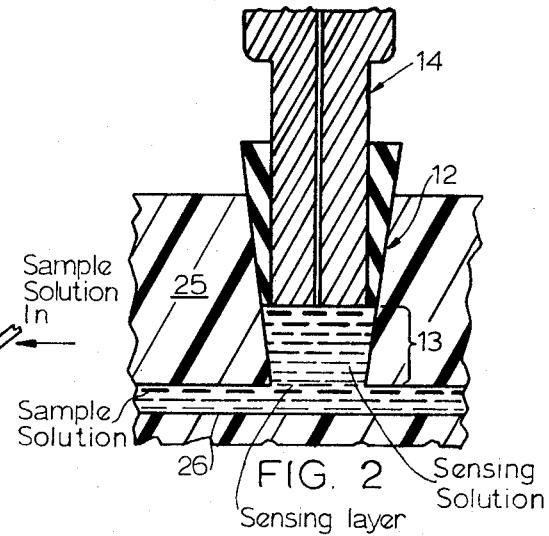
FIG. 2 is an enlarged sectional view of the sensing electrode.
Figure 3:
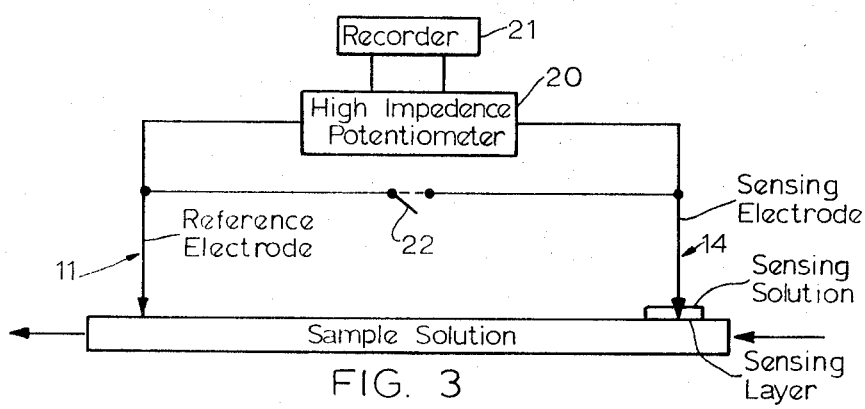
FIG. 3 is a schematic circuit and flow diagram.

In the embodiment of the invention illustrated by the generalized diagrams of FIGS. 1, 2 and 3 the "flow cell" of the invention may be considered to be a composite "electrode" in the sense such term is used in the art and includes a chamber 10 holding a conventional, reversible reference electrode 11, a further chamber 12 holding a static, lipid membrane forming solution in a lower chamber portion 13 and consisting, for example, of a phospholipid and a macrocyclic compound dissolved in a non-aqueous phase. A second conventional, reversible electrode 14, the "sensing" electrode is mounted in chamber 12 and makes electrical contact with the static membrane forming solution which is held in the lower chamber portion 13 and makes direct layer contact with the moving sample solution. It is particularly significant to note that the membrane forming solution remains trapped in the small lower chamber portion 13 and that the sample and membrane solutions establish a direct sliding layer to layer contact at a boundary layer across which the desired potential is developed.

Electrical connections between the solutions and the measuring instrument 20, a high impedance potentiometer, and associated recorder 21 are established through the mentioned conventional, reversible reference and sensing electrodes 11, 14 ($H_g$ :$H_gCl_2$ or $A_g$ :$A_gCl$) having the usual KCl bridges. The KCl bridge may be eliminated in the sensing electrode. The sensing electrode 11 may be connected either to the one side of the potentiometer 20 during measuring or directly to the reference electrode during non-measuring periods, a switch 22 being provided for this purpose. The reference electrode can be connected to ground if so required by the measuring system. The lipid membrane forming solution as previously noted is confined in the small chamber portion 13 so as to make direct layer contact with the sample solution. The membrane solution may consist of a solution of phospholipid and macrocyclic compound dissolved in a non-aqueous solvent, e.g. decane, the chemical nature of a suitable phospholipid, macrocyclic compound and solvent being as described in the co-pending applications. In addition to the macrocyclic compounds mentioned heretofore in this and in the co-pending applications, it has also been found that at least some macrocyclic polyether compounds will produce the results desired. In particular, a macrocyclic polyether synthesized by C. J. Pedersen of the Elastomer Branch of E. I. duPont deNemours and Company, Inc. has been successfully employed and it can be observed that the selected polyether (hereafter referred to as XXX-I) operates as an ion selective medium by exhibiting the capability of forming complexes with the potassium ions. The particular composition has been designated XXX-I and has been identified as containing 18 ring atoms and 6 ring oxygens. Pedersen refers to this class of compounds as crown compounds and in his nomanclature this composition is dicyclohexyl-18 crown 6. Reference may be made to the following literature reference for further identification: "Cyclic Polyethers and Their Complexes with Metal Salts", Journal of American Chemical Society, Volume 89, Pages 7017–7036, 1967 by C. J. Pedersen. When the composition XXX-I was present in the previously mentioned lecithin-decane mixture in a concentration of 10 millimoles per liter, it produced essentially the same electrode responses to those observed when the non-aqueous phase contained 0.01 milligrams of nonactin per milliter of lecithin-decane.

Reversible electrodes suitable to the invention may be calomel electrodes with KCl bridges and of the standard Beckman fiberojunction type. A Varian potentiometric recorder is preferably connected through a zero gain, impedance matching preamplifier, such as the Keithly Model 300, having a nominal input impedance of $10^{13}$ ohms. While various suitable non-aqueous membrane forming solutions are described in the co-pending application one such solution was made by dissolving crude soybean lecithin (Centrolex C. Lecithin, Central Soya Company) in n-decane to give a final concentration of 30 mgm lecithin/ml. Nonactin (supplied by the Squibb Research Institute) was added to the phospholipid-decane solution to give a final concentration of 0.01 mgm of the macrocyclic ester per ml. Both the aqueous sample and reference solutions were unbuffered with a pH of 5.5 to 6.0.

Figure 4:
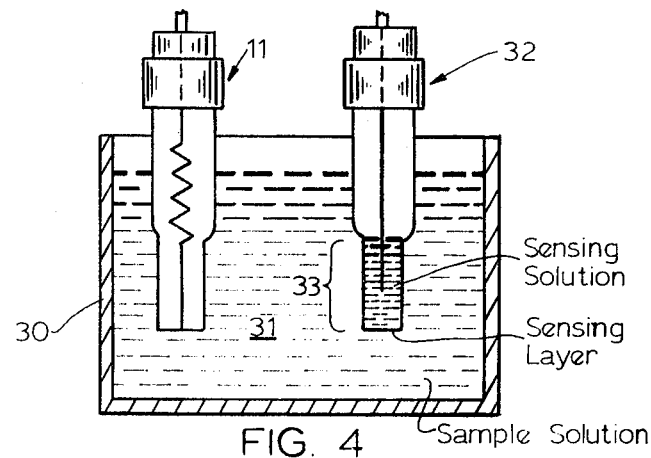
FIG. 4 is a somewhat schematic section view illustrating a second embodiment.

A structure suitable to providing a flow path for a moving sample solution and to holding the static non-aqueous membrane forming solution is illustrated in FIGS. 1, 2 and 3 in one embodiment. In FIG. 4 there is shown an alternate dip-stick embodiment. The chamber block 25 shown in FIGS. 1 and 2 provides the chamber 10 for the reference electrode 11, the chamber 12 for the sensing electrode 14, the lower chamber portion 13 for the phospholipid, macrocyclic compound-decane solution (hereafter called PMD solution) which establishes the desired ion selective membrane and tubular path 26 which provides a flow path for the sample solution and which should be kept to a minimum size to minimize the sample size. Tube 26 should be kept filled and closed or under positive pressure. While not limited to such materials it may be said generally that block 25 should be made of non-conducting, hydrophobic, mechanically rugged plastic. It should be expected that satisfactory results will be obtained in most applications when block 25 is made of polar e.g., glass or non-polar materials, e.g., Lucite, Teflon, polyethylene or polypropylene. From the overall description of the invention those skilled in the art will more readily appreciate the wide choice and controlling considerations in selecting materials for the block construction.

The size of the chambers is essentially not critical. Tubular path 26 and chamber portion 13 should be as small as possible. The various sizes can be said to be determined primarily by the desired convenience in handling the solutions, by the desired flow rate and by the tolerable electrical resistance of the overall system. To enhance the mechanical stability of the sensing layer it is desirable however that the sample solution chamber 13 and the sensing layer itself be of minimum size, particularly in the flow cell embodiment of FIGS. 1, 2 and 3, because of the continuous washing action caused by the moving sample solution. A volume of 0.1 milliter, for example, will give satisfactory results.

The most widely used type of sensing electrode is the type known as the dipping electrode, sometimes referred to as a dipstick type. This type of electrode is useful in many laboratory applications. A typical use is that of putting an appropriate ion sensing electrode and a conventional reference electrode in a beaker containing a discrete sample of the solution of interest and making the desired measurement as in FIG. 4. Because of the widespread practice and need for making measurements of ionic activity in discrete samples it is apparent that the present invention or at least the sensing electrode portion would be more useful if applicable to both static and flow measurements. Such an alternate embodiment is shown in FIG. 4.

Referring to FIG. 4, the invention is shown applied to a dip-stick type arrangement in which the conventional reversible reference electrode 11 is shown placed in a beaker 30 having the aqueous sample solution 31 whose ionic activity is of interest. A modified conventional reversible electrode 32 has an air evacuated chamber 33 in which is confined a small quantity of the membrane forming solution and which is held by reason of electrode 32 being closed at its upper end. The lower end of chamber 33 is open so that when electrode 32 is positioned as in FIG. 4 a direct layer contact is made between the non-aqueous sensing solution and the aqueous sample solution of interest.

In connection with the dip-stick static embodiment of FIG. 4 as with the flow cell embodiment of FIGS. 1, 2 and 3 it should be noted that the membrane solution makes direct horizontal layer contact with the sample solution and without confining the membrane solution between cellophane sheets as in the co-pending applications. The membrane solution being lighter than dilute salt solutions will "float" on the sample solution and somewhat unexpectedly does not tend to dilute or leave its chamber i.e. chamber portion 13 in FIG. 2 or chamber 33 in FIG. 4.

To place the flow cell of FIGS. 1, 2 and 3 in operation, the tubular path 26 is filled with the sample solution and is closed or put under positive pressure, the membrane solution is floated into chamber portion 13 and is thus layered onto the sample solution, and electrodes 11 and 14 are installed and connected as in FIG. 3. Flow of the sample solution may now commence and a record may be made of the developed potential across the sensing layer as an indication of the ionic activity of interest, e.g. potassium ion activity.

The dip-stick operation illustrated by FIG. 4 will be understood as requiring only that the sensing electrode 32 be previously evacuated and loaded with the membrane solution preparatory to use. The electrode acts somewhat like a filled pipette closed at one end by a finger and retains the solution. In a particular measurement the electrodes are arranged as in FIG. 4 and electrically connected as in FIG. 3.

Aside from the advantage of eliminating the cellophane sheets and thus simplifying the construction it can also be observed that the membrane solution may be quickly washed out and refilled.

What is claimed is:

1. In a system for measuring the activity of selected ions in an aqueous solution having both the selected ions and other ions:

a. a non-aqueous sensing membrane solution which includes a non-aqueous hydrophobic solvent, a surface active phospholipid agent and a macrocyclic compound, said sensing solution being adapted when in direct layer contact with said aqueous solution to exhibit in such layer an interface which includes the surface active agent and compound and is characterized by being highly selective to said selected ions such that a measurable voltage appears across said layer and in substantially immediate response to the activity and changes in said activity of said selected ions, and wherein said compound determines the highly selective character and the agent determines the immediate response;

b. means providing an enclosed vertical chamber having an open lower end and holding therein in a static state a predetermined substantially small volume of said membrane solution, said chamber adapting the bulk of said sensing solution to being held isolated from said aqueous solution while permitting the said sensing solution retained in said chamber open end to be placed in direct layer contact with said aqueous solution; and c. means for measuring the voltage developed across said layer as a function of said activity when said chamber open end is positioned to bring said sensing and aqueous solutions in said direct layer contact.

2. In a system as claimed in claim 1 wherein said chamber lower open end communicates with a passage adapted to confine said aqueous solution in said passage, whereby the said selected portion of said membrane solution makes said direct layer contact with said aqueous solution.

3. In a system as claimed in claim 2 wherein said passage is adapted to have said aqueous solution continuously flowing therethrough.

4. In a system as claimed in claim 3 wherein said chamber is formed in a block of material adapted to mount a pair of electrodes for measuring said voltage.

5. In a system as claimed in claim 1 wherein said chamber is formed in the lower end of a dip-stick type electrode such that the said open lower end of said chamber is adapted to be dipped in a container of said aqueous solution.

* * * * *

UNITED STATES PATENT OFFICE
CERTIFICATE OF CORRECTION

Patent No. 3,657,095  Dated April 18, 1972

Inventor(s) Daniel C. Tosteson

It is certified that error appears in the above-identified patent and that said Letters Patent are hereby corrected as shown below:

Column 1, line 61, the semi-colon after "tial" should be a comma.

Column 3, line 46, after the word "forming" the word -solution- should be inserted.

Column 5, line 3, "fiberojunction" should be -fiber-junction-.

Signed and sealed this 26th day of March 1974.

(SEAL)
Attest:

EDWARD M. FLETCHER, JR.    C. MARSHALL DANN
Attesting Officer           Commissioner of Patents